US012639134B2

(12) United States Patent　　　　(10) Patent No.:　US 12,639,134 B2
　　Li　　　　　　　　　　　　　　　(45) Date of Patent:　　May 26, 2026

(54) METHOD, APPARATUS, ELECTRONIC DEVICE AND STORAGE MEDIUM FOR APPLICATION STATE SYNCHRONIZATION

(71) Applicant: Beijing Bytedance Network Technology Co., Ltd., Beijing (CN)

(72) Inventor: Jing Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 77 days.

(21) Appl. No.: 18/435,958

(22) Filed: Feb. 7, 2024

(65) Prior Publication Data

US 2024/0176678 A1　　May 30, 2024

Related U.S. Application Data

(63) Continuation of application No. PCT/CN2022/106591, filed on Jul. 19, 2022.

(30) Foreign Application Priority Data

Nov. 8, 2021　(CN) .......................... 202111314631.7

(51) Int. Cl.
　　*G06F 9/52*　　　(2006.01)
　　*G06F 9/445*　　(2018.01)
　　　　　(Continued)

(52) U.S. Cl.
　　CPC ............ *G06F 9/52* (2013.01); *G06F 9/44505* (2013.01); *G06F 9/451* (2018.02); *G06F 9/546* (2013.01)

(58) Field of Classification Search
　　CPC ........ G06F 9/52; G06F 9/451; G06F 9/44505; G06F 9/546

(Continued)

(56) References Cited

U.S. PATENT DOCUMENTS 5,331,579 A　*　7/1994　Maguire, Jr. ........... G06F 30/13
　　　　　　　　　　　　　　　　　　706/920
5,553,239 A　*　9/1996　Heath ................. H04L 12/1439
　　　　　　　　　　　　　　　　　　705/77

(Continued)

FOREIGN PATENT DOCUMENTS

CN　　　110058905　　　7/2019
CN　　　111273948　　　6/2020
　　　　　(Continued)

OTHER PUBLICATIONS

International Search Report and Written Opinion in International Appln. No. PCT/CN2022/106591, mailed on Sep. 26, 2022, 5 pages (with English translation).

*Primary Examiner* — Paul R. Myers
(74) *Attorney, Agent, or Firm* — Fish & Richardson P.C.

(57)　　　　　　ABSTRACT

The disclosure provides methods, apparatus, electronic devices, storage media, computer program products and computer programs for application state synchronization, which are applied to electronic devices. The electronic device runs a first operating system and a second operating system running in the first operating system in a containerized manner. One of the methods includes, in response to a target operation on a target application by a user, controlling the first operating system to send a target operation request to the second operating system. The target application is an application program of the second operating system included in the first operating system. The target operation is performed in the second operating system and the second operating system is controlled to send a target operation success message to the first operating system. A proxy object of the target application is updated in the first operating system. operation.

18 Claims, 5 Drawing Sheets

(51) Int. Cl.
  G06F 9/451 (2018.01)
  G06F 9/54 (2006.01)

(58) Field of Classification Search
  USPC .............................................. 713/2
  See application file for complete search history.

(56) References Cited

U.S. PATENT DOCUMENTS

| | | | |
|---|---|---|---|
| 6,327,653 B1* | 12/2001 | Lee ...................... | G06F 9/4406 |
| | | | 713/323 |
| 8,677,359 B1* | 3/2014 | Cavage ................ | G06F 9/5011 |
| | | | 718/1 |
| 9,785,458 B2* | 10/2017 | Neil ..................... | G06F 9/45537 |
| 10,042,680 B2* | 8/2018 | Major ................ | G06F 21/6218 |
| 10,585,755 B2* | 3/2020 | Yamamoto .......... | G06F 11/0724 |
| 2003/0070162 A1* | 4/2003 | Oshima ................ | G06F 9/4406 |
| | | | 717/176 |
| 2004/0158841 A1* | 8/2004 | Bochkarev ............. | G06F 9/451 |
| | | | 719/321 |
| 2005/0033582 A1* | 2/2005 | Gadd ...................... | G10L 15/26 |
| | | | 704/E15.04 |
| 2005/0091354 A1* | 4/2005 | Lowell ................ | G06F 11/3051 |
| | | | 709/224 |
| 2006/0123432 A1* | 6/2006 | Bendapudi ............. | G06F 9/547 |
| | | | 719/330 |
| 2009/0216916 A1* | 8/2009 | Jang .................... | G06F 12/1408 |
| | | | 710/22 |
| 2009/0247134 A1 | 10/2009 | Jeide et al. | |
| 2010/0138832 A1* | 6/2010 | Kim .................... | G06F 9/45537 |
| | | | 718/1 |
| 2011/0191627 A1* | 8/2011 | Koning .................. | G06F 11/00 |
| | | | 714/10 |
| 2012/0084792 A1* | 4/2012 | Benedek ................. | G06F 9/544 |
| | | | 719/313 |
| 2013/0247065 A1* | 9/2013 | Lee ........................... | G06F 9/50 |
| | | | 718/104 |
| 2014/0032810 A1* | 1/2014 | Kanigicherla ...... | G06F 13/4027 |
| | | | 710/314 |
| 2015/0046325 A1* | 2/2015 | McCracken ........... | G06F 9/452 |
| | | | 705/43 |
| 2017/0230834 A1* | 8/2017 | Li ........................... | H04W 4/14 |
| 2018/0268156 A1* | 9/2018 | Luo ..................... | G06F 21/6218 |
| 2018/0322307 A1* | 11/2018 | Viswanathan .......... | G06F 21/74 |
| 2019/0013963 A1* | 1/2019 | Papo ....................... | G06F 9/455 |
| 2019/0116348 A1* | 4/2019 | Liu ....................... | H04N 21/443 |
| 2022/0164193 A1* | 5/2022 | Choi .................. | G06F 9/45558 |
| 2022/0417813 A1* | 12/2022 | Kolan .............. | H04W 36/0033 |

FOREIGN PATENT DOCUMENTS

| | | |
|---|---|---|
| CN | 112015475 | 12/2020 |
| CN | 112286667 | 1/2021 |
| CN | 114281555 | 4/2022 |

* cited by examiner

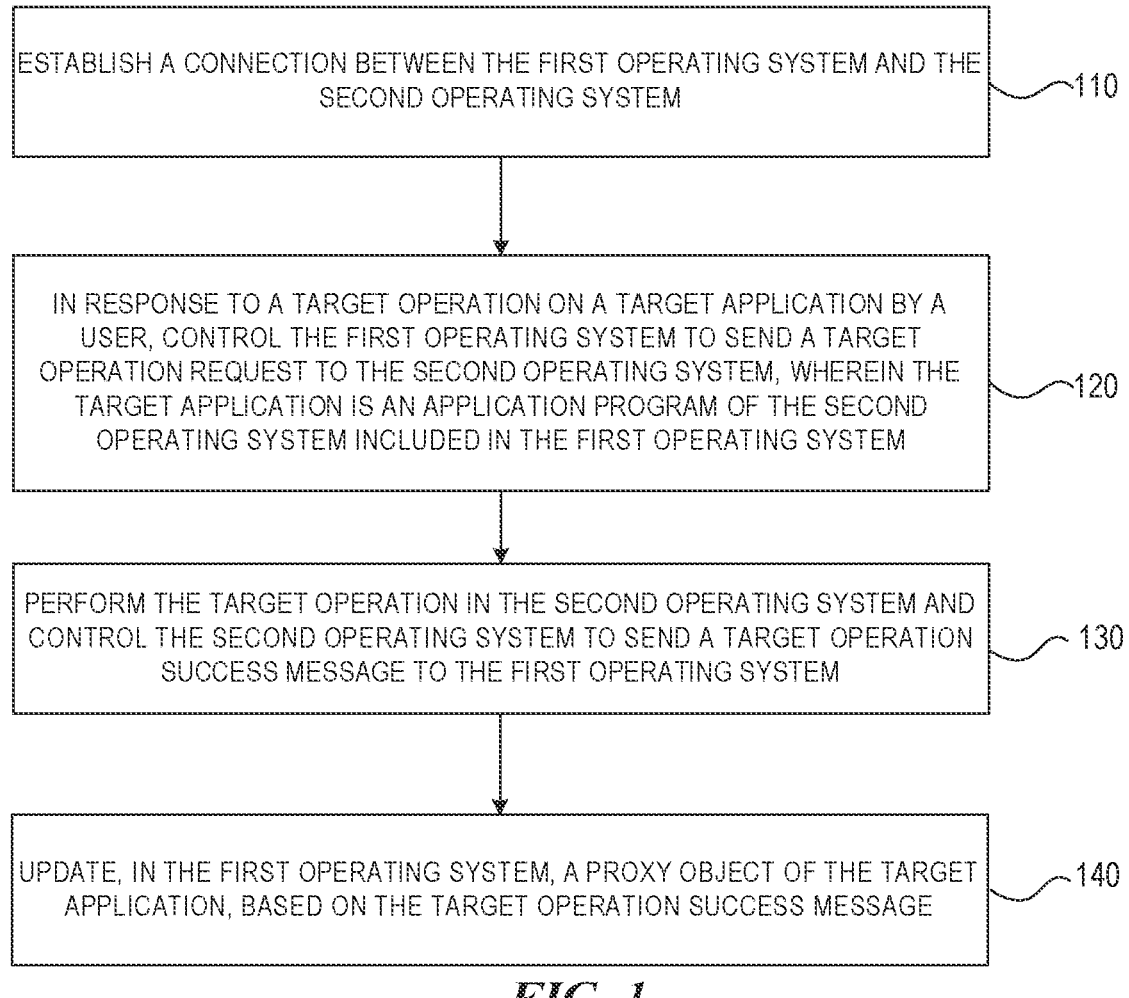

ESTABLISH A CONNECTION BETWEEN THE FIRST OPERATING SYSTEM AND THE SECOND OPERATING SYSTEM ～110

IN RESPONSE TO A TARGET OPERATION ON A TARGET APPLICATION BY A USER, CONTROL THE FIRST OPERATING SYSTEM TO SEND A TARGET OPERATION REQUEST TO THE SECOND OPERATING SYSTEM, WHEREIN THE TARGET APPLICATION IS AN APPLICATION PROGRAM OF THE SECOND OPERATING SYSTEM INCLUDED IN THE FIRST OPERATING SYSTEM ～120

PERFORM THE TARGET OPERATION IN THE SECOND OPERATING SYSTEM AND CONTROL THE SECOND OPERATING SYSTEM TO SEND A TARGET OPERATION SUCCESS MESSAGE TO THE FIRST OPERATING SYSTEM ～130

UPDATE, IN THE FIRST OPERATING SYSTEM, A PROXY OBJECT OF THE TARGET APPLICATION, BASED ON THE TARGET OPERATION SUCCESS MESSAGE ～140

*FIG. 1*

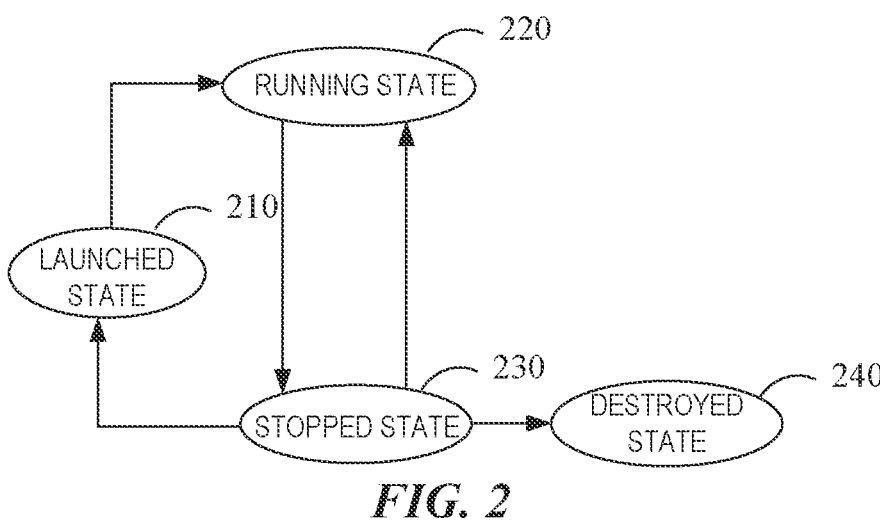

220 RUNNING STATE

210 LAUNCHED STATE

230 STOPPED STATE

240 DESTROYED STATE

*FIG. 2*

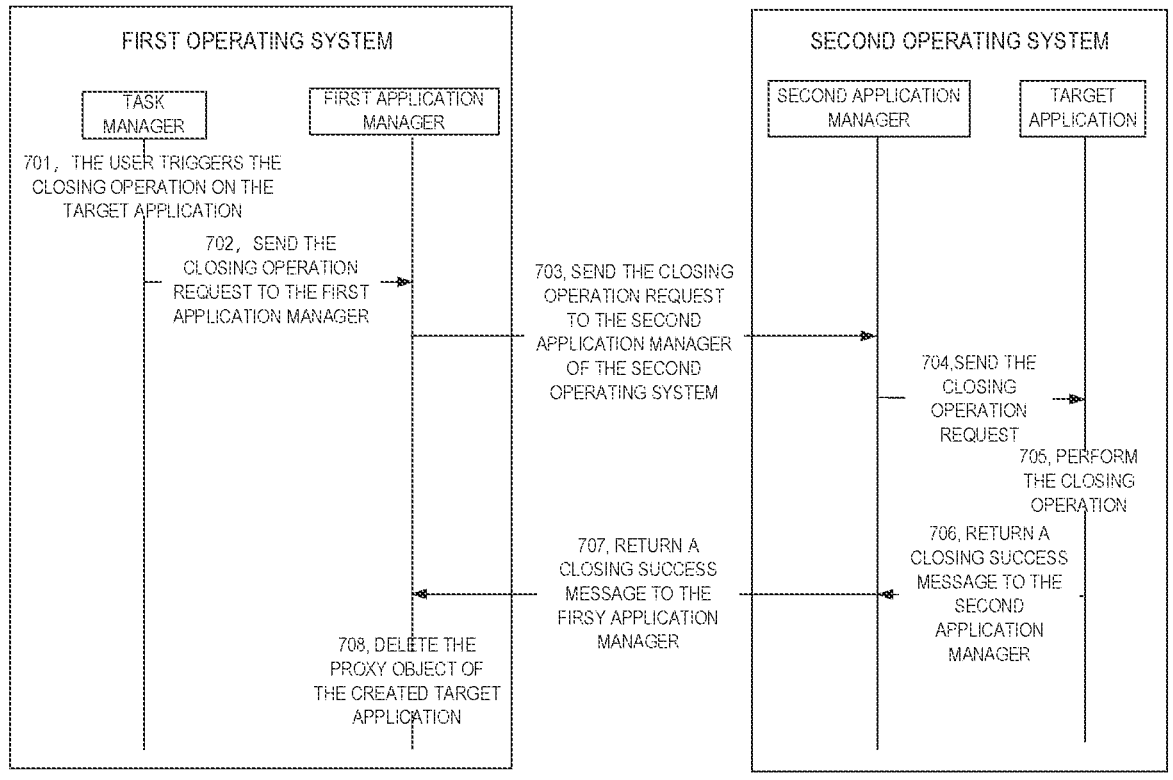

FIRST OPERATING SYSTEM

TASK MANAGER

FIRST APPLICATION MANAGER

SECOND OPERATING SYSTEM

SECOND APPLICATION MANAGER

TARGET APPLICATION

701, THE USER TRIGGERS THE CLOSING OPERATION ON THE TARGET APPLICATION

702, SEND THE CLOSING OPERATION REQUEST TO THE FIRST APPLICATION MANAGER

703, SEND THE CLOSING OPERATION REQUEST TO THE SECOND APPLICATION MANAGER OF THE SECOND OPERATING SYSTEM

704, SEND THE CLOSING OPERATION REQUEST

705, PERFORM THE CLOSING OPERATION

707, RETURN A CLOSING SUCCESS MESSAGE TO THE FIRSY APPLICATION MANAGER

706, RETURN A CLOSING SUCCESS MESSAGE TO THE SECOND APPLICATION MANAGER

708, DELETE THE PROXY OBJECT OF THE CREATED TARGET APPLICATION

*FIG. 7*

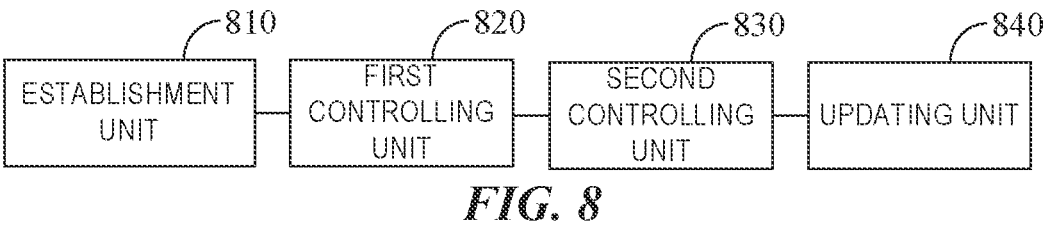

ESTABLISHMENT UNIT ⌐810

FIRST CONTROLLING UNIT ⌐820

SECOND CONTROLLING UNIT ⌐830

UPDATING UNIT ⌐840

*FIG. 8*

METHOD, APPARATUS, ELECTRONIC DEVICE AND STORAGE MEDIUM FOR APPLICATION STATE SYNCHRONIZATION

CROSS-REFERENCE TO RELATED APPLICATIONS

This application is a continuation application of, and claims priority to, PCT application PCT/CN2022/106591, filed on Jul. 19, 2022, which claims priority to Chinese Patent Application No. 202111314631.7, filed on Nov. 8, 2021, and entitled "Method, apparatus, electronic device and storage medium for application state synchronization." The disclosure of the foregoing applications are incorporated here by reference.

BACKGROUND

Field

The present disclosure relates to the field of computer technology, and more particularly to a method, apparatus, electronic device, storage medium, computer program product and computer program for application state synchronization.

Background

With the development of computer technology, in order to expand applications (referred to as APP) under the Linux® operating system and enrich the application environments, the Linux® operating system may support running applications of the Android® operating system.

Some conventional solutions such as Anbox, etc. are usually used to realize the Linux® operating system supporting operations of Android® applications.

SUMMARY

For the problems existing in the prior art, embodiments of the present disclosure provide a method, apparatus, electronic device and storage medium for application state synchronization.

A method for application state synchronization is provided. The method is applied to an electronic device, where the electronic device runs a first operating system and a second operating system, the second operating system runs in the first operating system in a containerized manner. In the method, a connection is established between the first operating system and the second operating system. In response to a target operation on a target application by a user, the first operating system is controlled to send a target operation request to the second operating system, and the target application is an application program of the second operating system included in the first operating system. The target operation is performed in the second operating system and the second operating system is controlled to send a target operation success message to the first operating system. A proxy object of the target application is updated in the first operating system based on the target operation success message and the proxy object comprises a current state of the target application.

According to the method for application state synchronization provided by the present disclosure, the first operating system comprises a first application manager, and the second operating system comprises a second application manager; the establishing a connection between the first operating system and the second operating system comprises: establishing a connection between the first application manager and the second application manager; if the target operation comprises a startup operation, the controlling the first operating system to send a target operation request to the second operating system comprises: controlling the first application manager to send a startup operation request to the target application through the second application manager; the controlling the second operating system to send a target operation success message to the first operating system comprises: controlling the target application to send a startup success message to the first application manager through the second application manager; and the updating a proxy object of the target application in the first operating system based on the target operation success message comprises: controlling the first application manager to set the current state of the target application to a foreground running state.

According to the method for application state synchronization provided by the present disclosure, if the startup operation is a startup operation of the target application triggered by the user on a desktop of the first operating system, the controlling the first application manager to send a startup operation request to the target application through the second application manager comprises: controlling the desktop of the first operating system to send the startup operation request to the target application through the first application manager and the second application manager; and if the startup operation is a startup operation of the target application triggered by the user on a current application of the first operating system, the controlling the first application manager to send a startup operation request to the target application through the second application manager comprises: controlling the current application to send the startup operation request to the target application through the first application manager and the second application manager.

According to the method for application state synchronization provided by the present disclosure, the first operating system further comprises a window manager; if the target operation comprises a background switching operation, the controlling the first operating system to send a target operation request to the second operating system comprises: controlling a desktop of the first operating system to send a background switching request to the target application through the first application manager and the second application manager; the controlling the second operating system to send a target operation success message to the first operating system comprises: controlling the target application to send a background switching success message to the first application manager through the second application manager; the updating a proxy object of the target application in the first operating system based on the target operation success message comprises: controlling the first application manager to set the current state of the target application to a background freeze state; before controlling a desktop of the first operating system to send a background switching request to the target application through the first application manager and the second application manager, the method further comprises: controlling the desktop of the first operating system to send the background switching operation request to the window manager; and controlling the window manager to switch a window of the target application to a background.

According to the method for application state synchronization provided by the present disclosure, the first operating system further comprises a task manager; if the target operation comprises a foreground switching operation, the controlling the first operating system to send a target operation request to the second operating system comprises: controlling the task manager to send a foreground switching request to the target application through the first application manager and the second application manager; the controlling the second operating system to send a target operation success message to the first operating system comprises: controlling the target application to send a foreground switching success message to the first application manager through the second application manager; the updating a proxy object of the target application in the first operating system based on the target operation success message comprises: controlling the first application manager to set the current state of the target application to the foreground running state; and before controlling the task manager to send a foreground switching request to the target application through the first application manager and the second application manager, the method further comprises: controlling the task manager to send the foreground switching operation request to the window manager; and controlling the window manager to switch the window of the target application to a foreground.

According to the method for application state synchronization provided by the present disclosure, if the target operation comprises a closing operation, the controlling the first operating system to send a target operation request to the second operating system comprises: controlling the task manager to send a closing operation request to the target application through the first application manager and the second application manager; the controlling the second operating system to send a target operation success message to the first operating system comprises: controlling the target application to send a closing success message to the first application manager through the second application manager; and the updating a proxy object of the target application in the first operating system based on the target operation success message comprises: controlling the first application manager to delete the proxy object of the target application.

According to the method for application state synchronization provided by the present disclosure, after performing the target operation in the second operating system, the method further comprises: controlling the second application manager to update the current state of the target application based on the target operation.

According to the method for application state synchronization provided by the present disclosure, the proxy object further comprises name information of the target application, and the name information of the target application corresponds to the current state one by one.

An apparatus for application state synchronization is provided. The apparatus for application state synchronization comprises: an establishing unit configured for establishing a connection between the first operating system and the second operating system; a first control unit configured for, in response to a target operation on a target application by a user, controlling the first operating system to send a target operation request to the second operating system, wherein the target application is an application program of the second operating system included in the first operating system; a second control unit configured for performing the target operation in the second operating system and controlling the second operating system to send a target operation success message to the first operating system; and an updating unit configured for updating, in the first operating system, a proxy object of the target application, based on the target operation success message, wherein the proxy object comprises a current state of the target application.

An electronic device is provided. The electronic device comprises a memory, a processor, and a computer program stored on the memory and executable on the processor, when the processor executes the program, the processor performs operations that implement steps of the method for application state synchronization of any of the above methods.

A non-transitory computer-readable storage medium is provided. The non-transitory computer-readable storage medium has a computer program stored thereon which, when executed by a processor, implements steps of the method for application state synchronization of any of the above methods.

A computer program product is provided. The computer program product comprises a computer program which, when executed by a processor, performs operations that implement steps of the method for application state synchronization of any of the above methods.

A computer program is provided. The computer program, when executed by a processor, performs operations that implement steps of the method for application state synchronization of any of the above methods.

The present disclosure provides a method, apparatus, electronic device, and storage medium for application state synchronization, in response to a target operation on a target application of a second operating system included in a first operating system by a user, the first operating system is controlled to send a target operation request to the second operating system, and the target operation is performed in the second operating system. When the first operating system receives a target operation success message sent by the second operating system, the first operating system updates current state of the target application, which realizes synchronization between the current state of the target application in the first operating system and the current state of the target application in the second operating system and is convenient for user operation.

BRIEF DESCRIPTION OF THE DRAWINGS

In order to more clearly illustrate the technical solutions in this disclosure or the prior art, the following will briefly introduce the drawings that need to be used in the description of the embodiments or the prior art. The drawings in the following description illustrate some embodiments of the present disclosure. Those skilled in the art can also obtain other drawings based on these drawings without any creative work.

FIG. 1 is the first schematic flow diagram of the method for application state synchronization provided by the present disclosure;

FIG. 2 is a state schematic diagram of a lifecycle of an application provided by the present disclosure;

FIG. 7 is the sixth schematic flow diagram of the method for application state synchronization provided by the present disclosure;

FIG. 8 is a structural schematic diagram of an apparatus for application state synchronization provided by the present disclosure.

DETAILED DESCRIPTION

Figure 3:
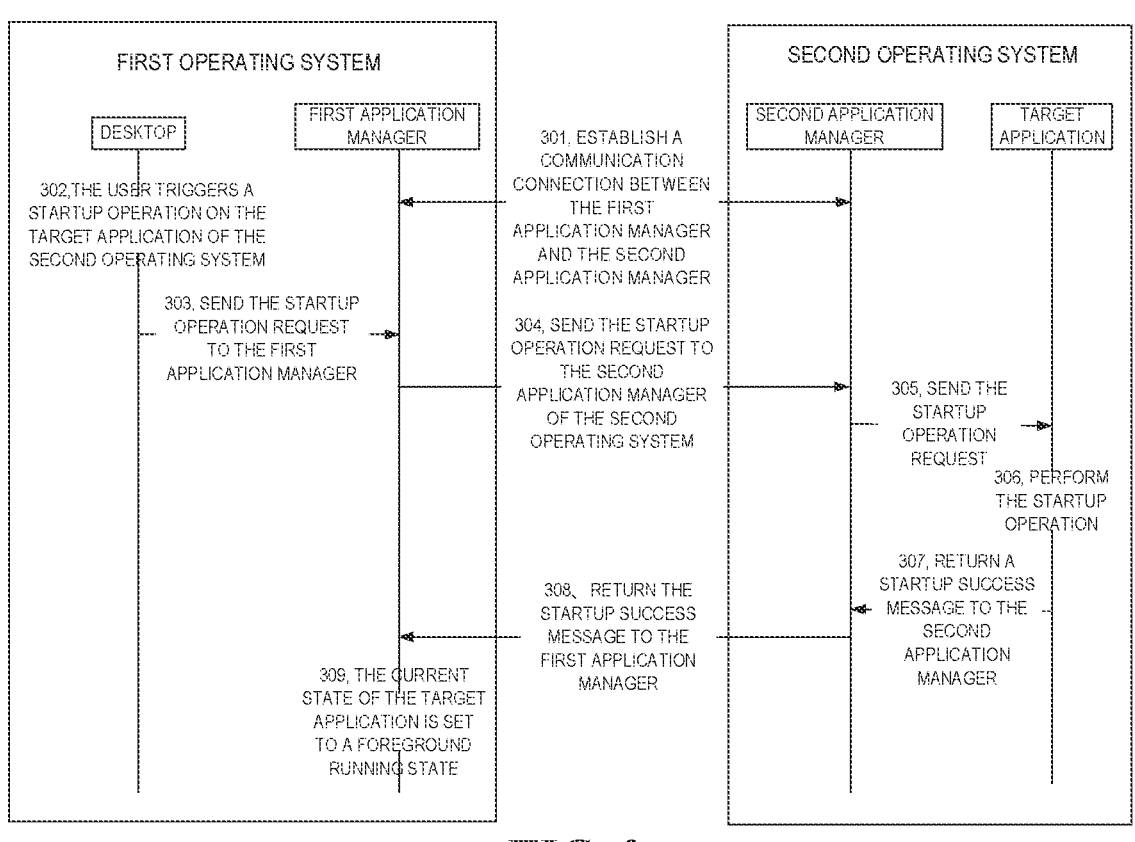
FIG. 3 is the second schematic flow diagram of the method for application state synchronization provided by the present disclosure.

In order to make the purpose, technical solution, and advantages of the present disclosure clearer, the technical solution in the present disclosure will be clearly and completely described below in conjunction with the accompanying drawings in the present disclosure. Obviously, the described embodiments are part of embodiments of the present disclosure, not all embodiments. Based on the embodiments in the present disclosure, all other embodiments obtained by those skilled in the art without creative labor are within the scope of protection of the present disclosure.

First, application scenarios related to embodiments of the present disclosure are introduced.

The method of embodiments of the present disclosure may be applied to an electronic device. In an embodiment, at least two systems may be set in the electronic device, such as a first operating system and a second operating system, and the second operating system runs in the first operating system in a containerized manner. As known to those skilled in the art, containerization is a Linux® container (LXC) implemented based on characteristics of the Linux® kernel, which makes full use of the characteristics of Control group and Namespace to isolate processes and resources, enabling efficient and lightweight implementation of the second operating system. The electronic device may be a mobile device such as a mobile phone, a tablet PC, etc.

In embodiments of the present disclosure, although not explicitly described, the first operating system and the second operating system may be the same, for example, the first operating system and the second operating system are both Linux® or Android®; the first operating system and the second operating system may be different, for example, one of the first operating system and the second operating system is Linux® and the other is Android. If the first operating system is Linux® and the second operating system is Android®, Android® application icons and Linux® application icons are displayed simultaneously on the desktop on the Linux® system side. Users may click on the Android® application icons to perform related operations for Android® applications. A task manager on the Linux® system side displays application screenshots of all running Android® applications and Linux® applications, and the user clicks on an application screenshot in the task manager to pull the application corresponding to the application screenshot to the foreground to run; the user can also close the corresponding application by taking an action on the screenshot of the application from the task manager to exit the application normally.

In embodiments of the present disclosure, the application refers to an application having one or more functions in the operating system, such as an instant messaging software, a shopping software, a music player, a video player, etc.

Existing solutions such as Anbox, etc. are usually used to realize the Linux® operating system supporting operations of Android® applications. However, in these solutions, there is no synchronization between the Android® application in the Linux® operating system and the Android® application in the Android® operating system, which will cause the current state of the Android® application in the Linux® operating system to be different from the current state of the Android® application in the Android® operating system, thereby causing inconvenience to the user's operation.

The method for application state synchronization of the present disclosure will be described below with reference to FIGS. 1-7.

FIG. 1 is the first schematic flow diagram of the method for application state synchronization provided by the present disclosure. As shown in FIG. 1, the method provided by the present embodiment may be applied to an electronic device, the electronic device runs a first operating system and a second operating system, and the second operating system runs in the first operating system in a containerized manner, and the method includes the following steps.

At step 110, the electronic device establishes a connection between the first operating system and the second operating system.

Specifically, in order to achieve data interaction between the first operating system and the second operating system, the first operating system and the second operating system need to establish a communication connection.

At step 120, in response to a target operation on a target application by a user, the electronic device controls the first operating system to send a target operation request to the second operating system.

The target application is an application program of the second operating system included in the first operating system.

Specifically, the user triggers the target operation on the target application. When the first operating system detects the target operation on the target application by the user, it determines whether the target application is an application of the second operating system based on the identification information of the target application. If the target application is determined to be an application of the second operating system, the first operating system sends a target operation request to the second operating system, which is used to request the performance of the target operation on the target application.

At step 130, the electronic device performs the target operation in the second operating system and control the second operating system to send a target operation success message to the first operating system.

Specifically, when the second operating system receives the target operation request sent by the first operating system, the second operating system parses the target operation request, determines that the target operation needs to be performed on the target application, and then controls the target application to perform the corresponding target operation. After the target operation is performed, the second operating system returns a target operation success message to the first operating system.

At step 140, the electronic device updates, in the first operating system, a proxy object of the target application, based on the target operation success message.

The proxy object includes the current state of the target application; further, the proxy object also includes name information of the target application; the name information of the target application corresponds to the current state one by one; that is, each application of the second operating system corresponds to a proxy object of the application on the first operating system side, and the proxy object of each application includes the name information of the application and the corresponding current state, which is convenient for searching for the current state of the application based on the name information of the application.

Specifically, when the first operating system receives the target operation success message sent by the second operating system, it determines that the first operating system has performed the target operation on the target application. At this time, the current state of the target application is set to the state corresponding to the target operation in the proxy object of the created target application, thereby achieving synchronization of the application states in the first operating system and the second operating system.

It should be noted that FIG. 2 is a state schematic diagram of a lifecycle of an application provided by the present disclosure. As shown in FIG. 2, the state of the lifecycle of the application mainly includes four states: a Launched state 210, a Running state 220, a Stopped state 230, and a Destroyed state 240. Regarding the Launched state 210, when the user launches the application, the application is in the Launched state 210, and the Launched state 210 can be switched to the Running state 220. Regarding the Running state 220, the Launched state 210 should be immediately switched to the Running state 220, and the Running state 220 represents the application returning to the foreground visual state. Regarding the Stopped state 230, after the application is switched to the background, it cannot obtain focus, and the state is changed to the Stopped state 230, which means that the application is deprived of the Central Processor (CPU) time slice and is in a frozen state. When the user clicks on the application screenshot through the task manager, the application is pulled to the foreground, and the focus can be obtained at this time, the Stopped state 230 is changed to the Running state 220. When the user clicks the application icon on the desktop to launch the application, the state of the application is switched to Launched state 210. Regarding the Destroyed state 240, when the operation system or the user close the system actively, the state of the application is switched to the Destroyed state 240. The present disclosure mainly updates the current state of the target application.

The present disclosure provides a method for application state synchronization, in response to a target operation on a target application of a second operating system included in a first operating system by a user, the first operating system is controlled to send a target operation request to the second operating system, and the target operation is performed in the second operating system. When the first operating system receives a target operation success message sent by the second operating system, the first operating system updates current state of the target application, which realizes synchronization between the current state of the target application in the first operating system and the current state of the target application in the second operating system and is convenient for user operation.

In an embodiment, the first operating system includes a first application manager, and the second operating system includes a second application manager, and establishing a connection between the first operating system and the second operating system is specifically: establishing a connection between the first application manager and the second application manager.

Alternatively, if the target operation comprises a startup operation, controlling the first operating system to send a target operation request to the second operating system may be achieved by way of controlling the first application manager to send a startup operation request to the target application through the second application manager.

Specifically, if the startup operation is a startup operation of the target application triggered by the user on the desktop of the first operating system, the desktop of the first operating system is controlled to send the startup operation request to the target application through the first application manager and the second application manager.

If the startup operation is a startup operation of the target application triggered by the user on a current application of the first operating system, the current application is controlled to send the startup operation request to the target application through the first application manager and the second application manager.

Alternatively, controlling the second operating system to send a target operation success message to the first operating system may be achieved by way of controlling the target application to send a startup success message to the first application manager through the second application manager.

Alternatively, updating a proxy object of the target application in the first operating system based on the target operation success message may be achieved by way of controlling the first application manager to set the current state of the target application to a foreground running state.

Specifically, FIG. 3 is the second schematic flow diagram of the method for application state synchronization provided by the present disclosure. As shown in FIG. 3, the first operating system includes a first application manager and a desktop of the first operating system, and the second operating system includes a second application manager and a target application. In the electronic device, a socket connection between the first application manager and the second application manager may be used to achieve interaction between the first operating system and the second operating system. FIG. 3 is a scenario for starting up the target application based on the desktop of the first operating system. The specific processes for application state synchronization have the following steps.

At step 301, the electronic device establishes a communication connection between the first application manager and the second application manager. At step 302, the user triggers a startup operation on the target application of the second operating system on the desktop of the first operating system. At step 303, the desktop of the first operating system sends the startup operation request to the first application manager when detecting the startup operation on the target application by the user, and the startup operation request is used to request the startup of the target application. At step 304, the first application manager parses identification information of the target application from the startup operation request when receiving the startup operation request, and determines whether the target application is an application of the second operating system based on the identification information of the target application. If the target application is determined to be the application of the second operating system, the first application manager sends the startup operation request to the second application manager of the second operating system. At step 305, the second application manager forwards the received startup operation request to the target application. At step 306, the target application performs the startup operation when receiving the startup operation request, that is, the target application is displayed in the foreground. At step 307, the target application returns a startup success message to the second application manager. At step 308, the second application manager forwards the startup success message to the first application manager of the first operating system. At step 309, the first application manager determines that the first operating system has started the target application when receiving the startup success message, and at this time, the current state of the target application is set to a foreground running state in the proxy object of the created target application. In this way, the current state of the target application in the second operating system and the current state of the target application in the first operating system are the same, both are foreground running states, thereby achieving synchronization of the application states in the first operating system and the second operating system.

Figure 4:
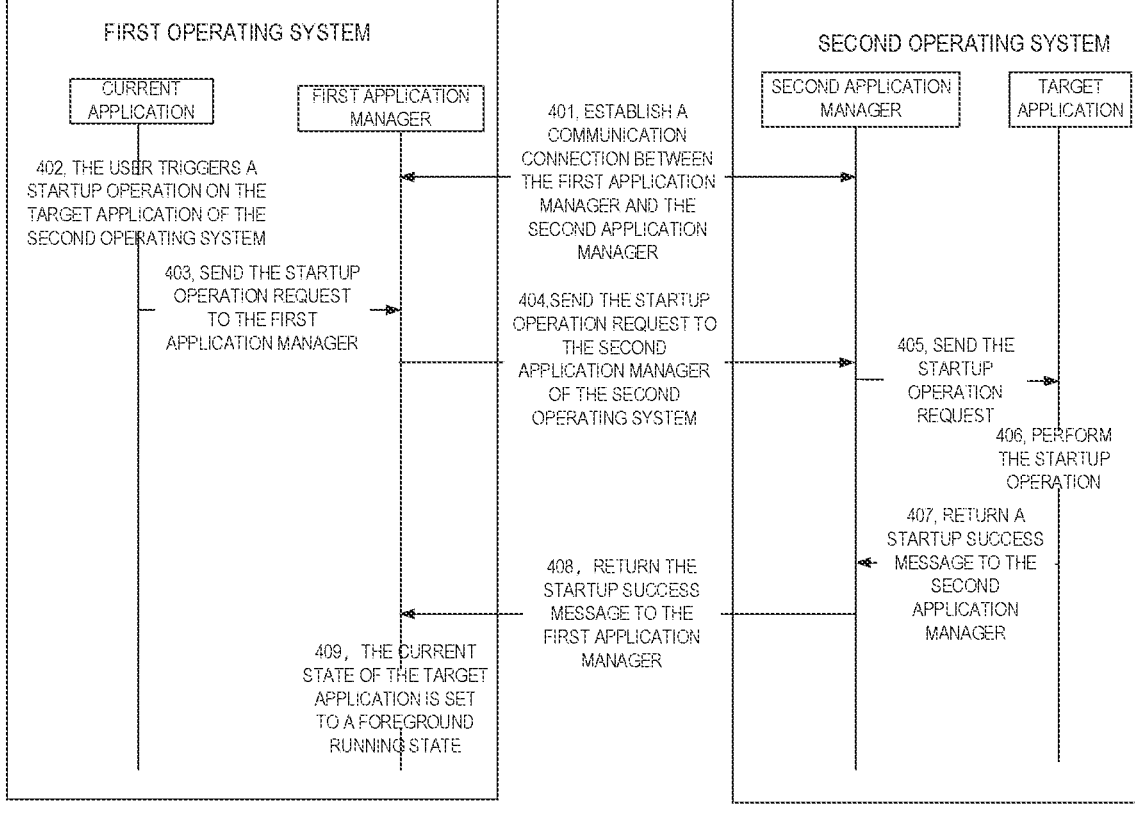
FIG. 4 is the third schematic flow diagram of the method for application state synchronization provided by the present disclosure.

Specifically, FIG. 4 is the third schematic flow diagram of the method for application state synchronization provided by the present disclosure. As shown in FIG. 4, the first operating system includes a first application manager and a current application, and the second operating system includes a second application manager and a target application. FIG. 4 is a scenario for starting up a target application based on the current application of the first operating system. The specific processes for application state synchronization have the following steps.

At step 401, the electronic device establishes a communication connection between the first application manager and the second application manager. At step 402, the user triggers a startup operation on the target application of the second operating system in the current application of the first operating system. At step 403, the current of the first operating system sends the startup operation request to the first application manager when detecting the startup operation on the target application by the user, and the startup operation request is used to request the startup of the target application. At step 404, the first application manager parses identification information of the target application from the startup operation request when receiving the startup operation request, and determines whether the target application is an application of the second operating system based on the identification information of the target application. If the target application is determined to be the application of the second operating system, the first application manager sends the startup operation request to the second application manager of the second operating system. At step 405, the second application manager forwards the received startup operation request to the target application. At step 406, the target application performs the startup operation when receiving the startup operation request, that is, the target application is displayed in the foreground. At step 407, the target application returns a startup success message to the second application manager. At step 408, the second application manager forwards the startup success message to the first application manager of the first operating system. At step 409, the first application manager determines that the first operating system has started the target application when receiving the startup success message, and at this time, the current state of the target application is set to a foreground running state in the proxy object of the created target application. In this way, the current state of the target application in the second operating system and the current state of the target application in the first operating system are the same, both are foreground running states, thereby achieving synchronization of the application states in the first operating system and the second operating system.

In an embodiment, the first operating system further includes a window manager; if the target operation comprises a background switching operation, controlling the first operating system to send a target operation request to the second operating system may be achieved by way of controlling a desktop of the first operating system to send a background switching request to the target application through the first application manager and the second application manager.

Alternatively, controlling the second operating system to send a target operation success message to the first operating system may be achieved by way of controlling the target application to send a background switching success message to the first application manager through the second application manager.

Alternatively, updating a proxy object of the target application in the first operating system based on the target operation success message may be achieved by way of controlling the first application manager to set the current state of the target application to a background freeze state.

Furthermore, before controlling a desktop of the first operating system to send a background switching request to the target application through the first application manager and the second application manager, the following steps need to be performed. The steps include controlling the desktop of the first operating system to send the background switching operation request to the window manager; and controlling the window manager to switch a window of the target application to a background.

Figure 5:
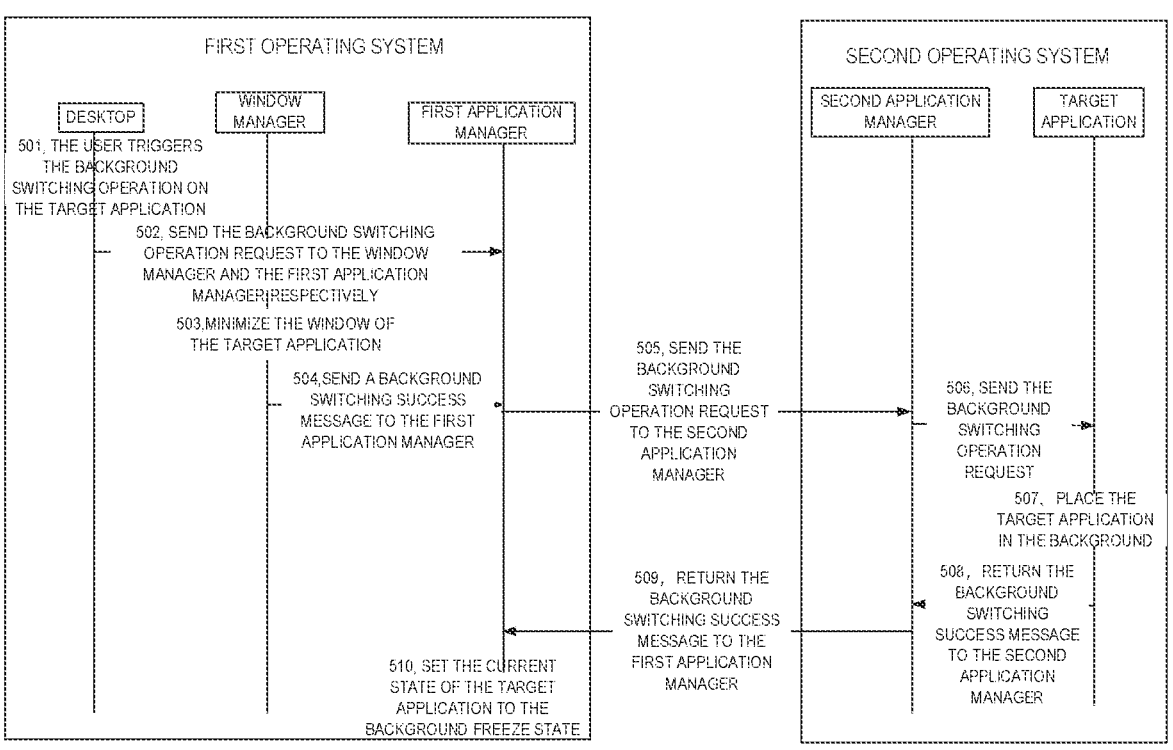
FIG. 5 is the fourth schematic flow diagram of the method for application state synchronization provided by the present disclosure.

Specifically, FIG. 5 is the fourth schematic flow diagram of the method for application state synchronization provided by the present disclosure. As shown in FIG. 5, the first operating system includes a first application manager, a desktop of the first operating system, and a window manager. The second operating system includes a second application manager and a target application. FIG. 5 is a scenario for switching the started target application from the foreground to the background in the first operating system. The specific processes for application state synchronization have the following steps.

At step 501, the user triggers a background switching operation on the target application of the second operating system on the desktop of the first operating system (for example, the user clicks a minimize icon in the window of the target application, or starts other applications which causes the target application to need to be switched to the background). At step 502, if the desktop of the first operating system detects the background switching operation on the target application by the user, it sends the background switching operation request to the window manager and the first application manager respectively, and the background switching operation request is used to request the target application to be switched from the foreground to the background. At step 503, the window manager minimizes the window of the target application and places it in the background when receiving the background switching operation request. At step 504, the window manager sends a background switching success message to the first application manager. At step 505, the first application manager parses identification information of the target application from the background switching operation request, and determines whether the target application is an application of the second operating system based on the identification information of the target application. If the target application is determined to be an application of the second operating system, the first application manager sends the background switching operation request to the second application manager of the second operating system. At step 506, the second application manager forwards the received background switching operation request to the target application. At step 507, the target application minimizes the window of the target application when receiving the background switching operation request, so that the target application is placed in the background. At step 508, the target application returns a background switching success message to the second application manager. At step 509, the second application manager forwards the background switching success message to the first application manager of the first operating system. At step 510, when the first application manager receives the background switching success message, it determines that the first operating system has switched the target application from the foreground to the background. At this time, the current state of the target application is set to the background freeze state in the proxy object of the created target application. If the target application is in the background freeze state, the first application manager notifies the kernel of the first operating system that the target application is in the freeze state. When the kernel of the first operating system receives the notification message, it prohibits the target application from obtaining focus, which means that the target application is deprived of CPU time slices. In this way, the current state of the target application in the second operating system is the same as that of the target application in the first operating system, both of which are the background freeze states. Therefore, synchronization of application states in the first operating system and the second operating system is achieved.

In an embodiment, the first operating system further comprises a task manager, if the target operation comprises a foreground switching operation, controlling the first operating system to send a target operation request to the second operating system may be achieved by way of controlling the task manager to send a foreground switching request to the target application through the first application manager and the second application manager.

Alternatively, controlling the second operating system to send a target operation success message to the first operating system can be achieved by way of controlling the target application to send a foreground switching success message to the first application manager through the second application manager.

Alternatively, updating a proxy object of the target application in the first operating system based on the target operation success message can be achieved by way of controlling the first application manager to set the current state of the target application to the foreground running state.

Furthermore, before controlling the task manager to send a foreground switching request to the target application through the first application manager and the second application manager, the following operations need to be performed. The operations include controlling the task manager to send the foreground switching operation request to the window manager; and controlling the window manager to switch the window of the target application to a foreground.

Figure 6:
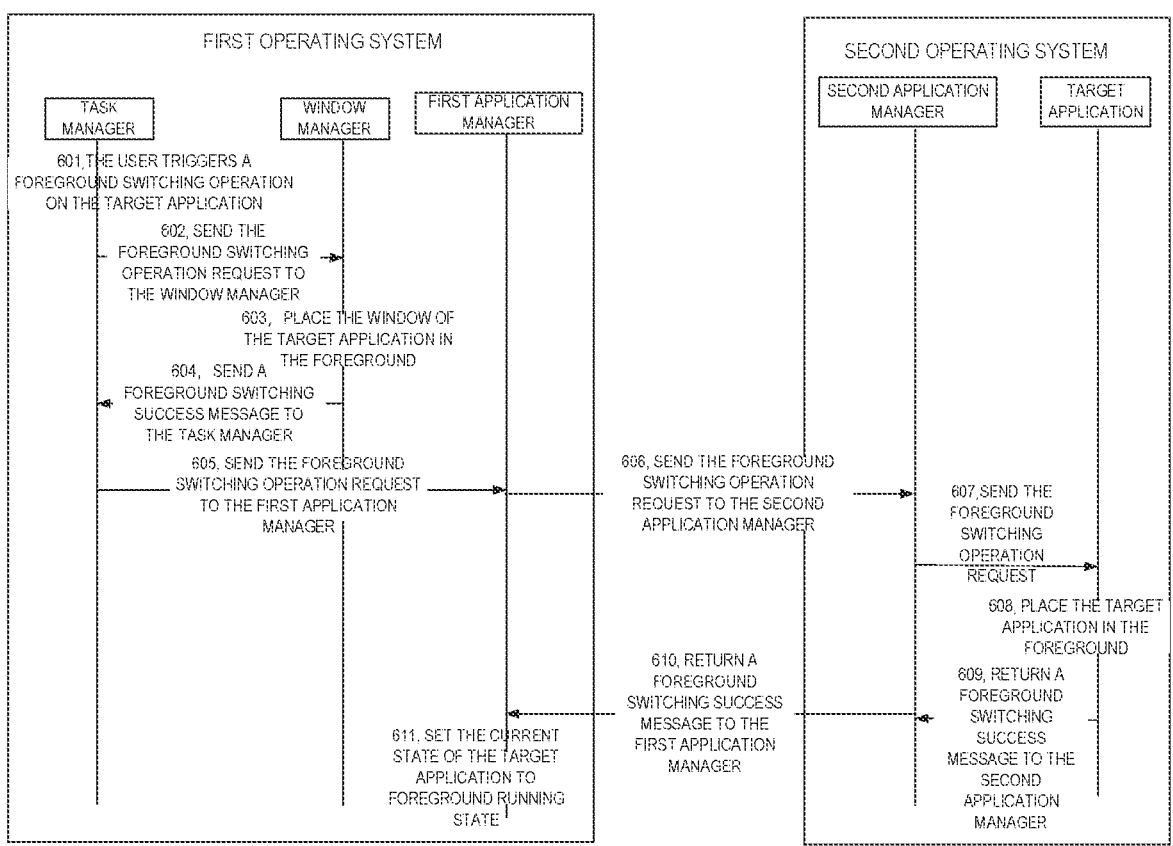
FIG. 6 is the fifth schematic flow diagram of the method for application state synchronization provided by the present disclosure.

Specifically, FIG. 6 is the fifth schematic flow diagram of the method for application state synchronization provided by the present disclosure. As shown in FIG. 6, the first operating system includes a first application manager, a task manager, and a window manager, and the second operating system includes a second application manager and a target application. FIG. 6 is a scenario for switching the started target application from the background to the foreground in the first operating system. The specific processes for application state synchronization have the following steps.

At step 601, the user triggers a foreground switching operation on the target application of the second operating system in the task manager of the first operating system (for example, the user clicks the icon thumbnail of the target application in the task manager). At step 602, the task manager sends the foreground switching operation request to the window manager when detecting the foreground switching operation on the target application by the user. At step 603, the window manager places the window of the target application in the foreground when receiving the foreground switching operation request. At step 604, the window manager sends a foreground switching success message to the task manager. At step 605, the task manager sends the foreground switching operation request to the first application manager, and the foreground switching operation request is used to request the target application to be switched from the background to the foreground. At step 606, the first application manager parses identification information of the target application from the foreground switching operation request when receiving the foreground switching operation request, and determines whether the target application is an application of the second operating system based on the identification information of the target application. If the target application is determined to be an application of the second operating system, the first application manager sends the foreground switching operation request to the second application manager of the second operating system. At step 607, the second application manager forwards the received foreground switching operation request to the target application. At step 608, the target application displays the window of the target application on the desktop when receiving the foreground switching operation request, so that the target application is located in the foreground. At step 609, the target application returns a foreground switching success message to the second application manager. At step 610, the second application manager forwards the foreground switching success message to the first application manager of the first operating system. At step 611, when the first application manager receives the foreground switching success message, it determines that the first operating system has switched the target application from the background to the foreground. At this time, the current state of the target application is set to the foreground running state in the proxy object of the created target application. When the target application is in the foreground running state, the first application manager notifies the kernel of the first operating system that the target application is in the foreground running state. When the kernel of the first operating system receives the notification message, it allows the target application to obtain focus and can occupy CPU time slices to run normally. In this way, the current state of the target application in the second operating system is the same as that of the target application in the first operating system, both of which are foreground running states. Therefore, synchronization of application states in the first operating system and the second operating system is achieved.

In an embodiment, if the target operation comprises a closing operation, controlling the first operating system to send a target operation request to the second operating system may be achieved by way of controlling the task manager to send a closing operation request to the target application through the first application manager and the second application manager.

Alternatively, controlling the second operating system to send a target operation success message to the first operating system may be achieved by way of controlling the target application to send a closing success message to the first application manager through the second application manager.

Alternatively, updating a proxy object of the target application in the first operating system based on the target operation success message may be achieved by way of controlling the first application manager to delete the proxy object of the target application.

Specifically, FIG. 7 is the sixth schematic flow diagram of the method for application state synchronization provided by the present disclosure. As shown in FIG. 7, the first operating system includes a first application manager and a task manager, and the second operating system includes a second application manager and a target application. FIG. 7 shows the scenario of closing the target application in the task manager of the first operating system. The specific processes for application state synchronization have the following steps.

At step 701, the user triggers a closing operation on the target application of the second operating system in the task manager. At step 702, when the task manager detects the closing operation on the target application by the user, it sends the closing operation request to the first application manager, which is used to request the closing of the target application. At step 703, the first application manager parses the identification information of the target application from the closing operation request when receiving the closing operation request, and determines whether the target application is an application of the second operating system based on the identification information of the target application. If the target application is determined to be an application of the second operating system, the first application manager sends a closing operation request to the second application manager of the second operating system. At step 704, the second application manager forwards the received closing operation request to the target application. At step 705, the target application performs the closing operation when receiving the closing operation request. At step 706, the target application returns a closing success message to the second application manager. At step 707, the second application manager forwards the closing success message to the first application manager of the first operating system. At step 708, the first application manager determines that the target application has been closed by the first operating system when receiving the closing success message, and deletes the proxy object of the created target application at this time. In this way, the current state of the target application in the second operating system is the same as that of the target application in the first operating system, both of which are closing states, thereby realizing the synchronization of the application states in the first operating system and the second operating system.

It should be noted that users can also click the close icon on the foreground window of the target application to achieve the closing operation of the target application. At this time, when the desktop of the first operating system detects the closing operation on the target application, it sends a closing operation request to the first application manager, which is not limited.

In an embodiment, after performing the target operation in the second operating system, the method further comprises the following step: controlling the second application manager to update the current state of the target application based on the target operation.

Specifically, when the second application manager receives the operation success message sent by the target application, it can determine the current state of the target application based on the operation success message, and then record the current state of the target application. In practical applications, the second application manager stores the name information of the target application corresponding to the current state, so that it is convenient to view the current state of each target application.

An apparatus for application state synchronization provided by the present disclosure will be described below. The apparatus for application state synchronization described below and the method for application state synchronization described above can correspond to each other.

FIG. 8 is a structural schematic diagram of an apparatus for application state synchronization provided by the present disclosure. As shown in FIG. 8, the apparatus for application state synchronization includes an establishment unit 810, a first controlling unit 820, a second controlling unit 830, and an updating unit 840. The establishment unit 810 is configured for establishing a connection between the first operating system and the second operating system. The first controlling unit 820 is configured for, in response to a target operation on a target application by a user, controlling the first operating system to send a target operation request to the second operating system, wherein the target application is an application program of the second operating system included in the first operating system. The second controlling unit 830 is configured for performing the target operation in the second operating system and controlling the second operating system to send a target operation success message to the first operating system. The updating unit 840 is configured for updating, in the first operating system, a proxy object of the target application, based on the target operation success message, where the proxy object comprises a current state of the target application.

In the apparatus for application state synchronization provided by the present disclosure, in response to a target operation on a target application of a second operating system included in a first operating system by a user, the first operating system is controlled to send a target operation request to the second operating system, and the target operation is performed in the second operating system. When the first operating system receives a target operation success message sent by the second operating system, the first operating system updates current state of the target application, which realizes synchronization between the current state of the target application in the first operating system and the current state of the target application in the second operating system and is convenient for user operation.

Based on any of the above embodiments, the first operating system includes a first application manager, and the second operating system includes a second application manager; the establishment unit 810 is specifically configured for: establishing a connection between the first application manager and the second application manager; if the target operation includes a startup operation, the first controlling unit 820 is specifically configured for: controlling the first application manager to send a startup operation request to the target application through the second application manager; the second controlling unit 830 is specifically configured for: controlling the target application to send a startup success message to the first application manager through the second application manager; the updating unit 840 is specifically configured for: controlling the first application manager to set the current state of the target application to a foreground running state.

Based on any of the above embodiments, if the startup operation is a startup operation of the target application triggered by the user on a desktop of the first operating system, the first controlling unit 820 is further configured for: controlling the desktop of the first operating system to send the startup operation request to the target application through the first application manager and the second application manager; if the startup operation is a startup operation of the target application triggered by the user on a current application of the first operating system, the first controlling unit 820 is further specifically configured for: controlling the current application to send the startup operation request to the target application through the first application manager and the second application manager.

Based on any of the above embodiments, the first operating system further comprises a window manager; if the target operation comprises a background switching operation, the first controlling unit 820 is further configured for: controlling a desktop of the first operating system to send a background switching request to the target application through the first application manager and the second application manager; the second controlling unit 830 is further specifically configured for: controlling the target application to send a background switching success message to the first application manager through the second application manager; the updating unit 840 is further specifically configured for: controlling the first application manager to set the current state of the target application to a background freeze state; the apparatus further comprises a third controlling unit and a fourth controlling unit; the third controlling unit is configured for controlling the desktop of the first operating system to send the background switching operation request to the window manager; and the fourth controlling unit is configured for controlling the window manager to switch a window of the target application to a background.

Based on any of the above embodiments, the first operating system further comprises a task manager; if the target operation comprises a foreground switching operation, the first controlling unit 820 is further configured for: controlling the task manager to send a foreground switching request to the target application through the first application manager and the second application manager. The second controlling unit 830 is further configured for: controlling the target application to send a foreground switching success message to the first application manager through the second application manager; the updating unit 840 is further specifically used for: controlling the first application manager to set the current state of the target application to the foreground running state; the apparatus further comprises a fifth controlling unit and a sixth controlling unit; the fifth controlling unit is configured for controlling the task manager to send the foreground switching operation request to the window manager; and the sixth controlling unit is configured for controlling the window manager to switch the window of the target application to a foreground.

Based on any of the above embodiments, if the target operation comprises a closing operation, the first controlling unit 820 is further specifically configured for: controlling the task manager to send a closing operation request to the target application through the first application manager and the second application manager; the second controlling unit 830 is further specifically configured for: controlling the target application to send a closing success message to the first application manager through the second application manager; the updating unit 840 is further specifically configured for: controlling the first application manager to delete the proxy object of the target application.

Based on any of the above embodiments, the apparatus further comprises a seventh controlling unit; the seventh controlling unit is configured for controlling the second application manager to update the current state of the target application based on the target operation.

Based on any of the above embodiments, the proxy object further comprises name information of the target application, and the name information of the target application corresponds to the current state one by one.

Figure 9:
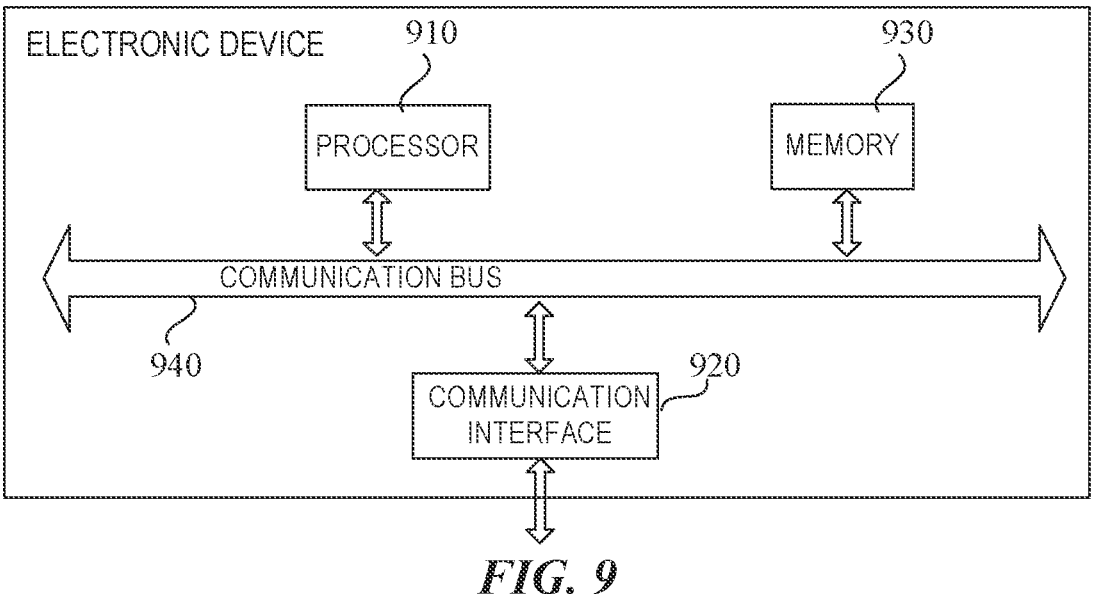
FIG. 9 is a schematic diagram of the physical structure of the electronic device provided by the present disclosure.

FIG. 9 is a schematic diagram of the physical structure of the electronic device provided by the present disclosure. As shown in FIG. 9, the electronic device may include: a processor 910, a communication interface 920, a memory 930, and a communication bus 940. The processor 910, the communication interface 920, and the memory 930 communicate with each other through the communication bus 940. The processor 910 may call logical instructions in the memory 930 to perform the method for application state synchronization. In the method, a connection is established between the first operating system and the second operating system. In response to a target operation on a target application by a user, the first operating system is controlled to send a target operation request to the second operating system and the target application is an application program of the second operating system included in the first operating system. The target operation is performed in the second operating system and the second operating system is controlled to send a target operation success message to the first operating system. The proxy object of the target application is updated in the first operating system based on the target operation success message and the proxy object comprises a current state of the target application.

In addition, the logical instructions in the aforementioned memory 930 can be implemented in the form of software functional units and can be stored in a computer-readable storage medium when sold or used as independent products. Based on this understanding, the technical solution of the present disclosure can be embodied in the form of a software product, which is stored in a storage medium and includes several instructions to make a computer device (which can be a personal computer, server, or network device, etc.) execute all or part of the steps of the methods described in each embodiment of the present disclosure. The aforementioned storage medium includes: U disk, mobile hard disk, Read-Only Memory (ROM), Random Access Memory (RAM), magnetic disk or optical disk, and other media that can store program code.

On the other hand, the present disclosure further provides a computer program product comprising a computer program, and the computer program can be stored on a non-transitory computer-readable storage medium, and when the computer program is executed by a processor, the computer can perform the method for application state synchronization provided by the above methods. In the method, a connection is established between the first operating system and the second operating system. In response to a target operation on a target application by a user, the first operating system is controlled to send a target operation request to the second operating system and the target application is an application program of the second operating system included in the first operating system. The target operation is performed in the second operating system and the second operating system is controlled to send a target operation success message to the first operating system. A proxy object of the target application is updated in the first operating system based on the target operation success message, wherein the proxy object comprises a current state of the target application.

On the other hand, the present disclosure also provides a non-transitory computer-readable storage medium, on which a computer program is stored, the computer program is implemented by a processor to perform the method for application state synchronization provided by the above methods. In the method, a connection is established between the first operating system and the second operating system. In response to a target operation on a target application by a user, the first operating system is controlled to send a target operation request to the second operating system and the target application is an application program of the second operating system included in the first operating system. The target operation is performed in the second operating system and the second operating system is controlled to send a target operation success message to the first operating system. A proxy object of the target application is updated in the first operating system based on the target operation success message, wherein the proxy object comprises a current state of the target application.

The apparatus embodiments described above are merely illustrative, where the units described as separate components may or may not be physically separated, the components displayed as units may or may not be physical units, i.e., may be located in one place, or may be distributed to a plurality of network units. Some or all of the modules may be selected according to actual needs to achieve the purpose of the present embodiment. Those of ordinary skill in the art without creative labor, that is, can be understood and implemented.

Through the description of the above embodiments, those skilled in the art can clearly understand that each embodiment can be implemented by means of software and a necessary universal hardware platform, of course, it can also be implemented by hardware. Based on this understanding, the above technical solution essentially or in part can be embodied in the form of a software product, which can be stored in a computer-readable storage medium such as ROM/RAM, magnetic disk, optical disk, etc., including several instructions for causing a computer device (which can be a personal computer, server, or network device, etc.) to execute certain parts of the various embodiments or embodiments.

Finally, it should be noted that: the above embodiments are only used to illustrate the technical solutions of the present disclosure, and not to limit them; although the present disclosure has been described in detail with reference to the foregoing embodiments, those of ordinary skill in the art should understand that: it is still possible to the foregoing embodiments technical solutions described modifications, or equivalents of some of the technical features; and these modifications or substitutions, do not make the essence of the corresponding technical solutions from the spirit and scope of the embodiments of the present disclosure.

What is claimed is:

1. A method for application state synchronization, comprising:

establishing, at an electronic device running a first operating system and a second operating system, a connection between the first operating system and the second operating system, the second operating system running in the first operating system in a containerized manner, wherein the first operating system comprises a first application manager, and the second operating system comprises a second application manager, and the establishing the connection between the first operating system and the second operating system comprises establishing a connection between the first application manager and the second application manager;

in response to a startup operation on a target application by a user, controlling the first application manager to send a startup operation request to the target application through the second application manager, wherein the target application is an application program of the second operating system included in the first operating system;

performing the startup operation in the second operating system and controlling the target application to send a startup success message to the first application manager through the second application manager; and updating, in the first operating system, a proxy object of the target application, based on the startup success message, wherein the proxy object comprises a current state of the target application, and the updating the proxy object of the target application comprises controlling the first application manager to set the current state of the target application to a foreground running state.

2. The method of claim 1, wherein if the startup operation is a startup operation of the target application triggered by the user on a desktop of the first operating system, the controlling the first application manager to send a startup operation request to the target application through the second application manager comprises:

controlling the desktop of the first operating system to send the startup operation request to the target application through the first application manager and the second application manager; and if the startup operation is a startup operation of the target application triggered by the user on a current application of the first operating system, the controlling the first application manager to send a startup operation request to the target application through the second application manager comprising:

controlling the current application to send the startup operation request to the target application through the first application manager and the second application manager.

3. The method of claim 1, wherein the first operating system further comprises a window manager;

if a target operation comprises a background switching operation, the controlling the first operating system to send a target operation request to the second operating system comprising:

controlling a desktop of the first operating system to send a background switching request to the target application through the first application manager and the second application manager;

the controlling the second operating system to send a target operation success message to the first operating system comprising:

controlling the target application to send a background switching success message to the first application manager through the second application manager;

the updating a proxy object of the target application in the first operating system based on the target operation success message comprising:

controlling the first application manager to set the current state of the target application to a background freeze state;

before controlling a desktop of the first operating system to send a background switching request to the target application through the first application manager and the second application manager, the method further comprising:

controlling the desktop of the first operating system to send the background switching operation request to the window manager; and controlling the window manager to switch a window of the target application to a background.

4. The method of claim 3, wherein the first operating system further comprises a task manager;

if the target operation comprises a foreground switching operation, the controlling the first operating system to send a target operation request to the second operating system comprising:

controlling the task manager to send a foreground switching request to the target application through the first application manager and the second application manager;

the controlling the second operating system to send a target operation success message to the first operating system comprising:

controlling the target application to send a foreground switching success message to the first application manager through the second application manager;

the updating a proxy object of the target application in the first operating system based on the target operation success message comprising:

controlling the first application manager to set the current state of the target application to the foreground running state; and before controlling the task manager to send a foreground switching request to the target application through the first application manager and the second application manager, the method further comprising:

controlling the task manager to send the foreground switching operation request to the window manager; and controlling the window manager to switch the window of the target application to a foreground.

5. The method of claim 4, wherein if the target operation comprises a closing operation, the controlling the first operating system to send a target operation request to the second operating system comprises:

controlling the task manager to send a closing operation request to the target application through the first application manager and the second application manager;

the controlling the second operating system to send a target operation success message to the first operating system comprising:

controlling the target application to send a closing success message to the first application manager through the second application manager; and the updating a proxy object of the target application in the first operating system based on the target operation success message comprising:

controlling the first application manager to delete the proxy object of the target application.

6. The method of claim 1, wherein after performing the startup operation in the second operating system, the method further comprises:

controlling the second application manager to update the current state of the target application based on the startup operation.

7. The method of claim 1, wherein the proxy object further comprises name information of the target application, and the name information of the target application corresponds to the current state one by one.

8. The method of claim 1, wherein the connection between the first operating system and the second operating system is a socket connection.

9. The method of claim 1, wherein the application program comprises at least one of: an instant messaging software, a shopping software, a music player or a video player.

10. An electronic device comprising a memory, a processor, and a computer program stored on the memory and executable on the processor, when the processor executes the computer program, the processor performs operations comprising:

establishing a connection between a first operating system and a second operating system, wherein the first operating system comprises a first application manager, and the second operating system comprises a second application manager, and the establishing the connection between the first operating system and the second operating system comprises establishing a connection between the first application manager and the second application manager;

in response to a startup operation on a target application by a user, controlling the first application manager to send a startup operation request to the target application through the second application manager, wherein the target application is an application program of the second operating system included in the first operating system;

performing the startup operation in the second operating system and controlling the target application to send a startup success message to the first application manager through the second application manager; and updating, in the first operating system, a proxy object of the target application, based on the startup success message, wherein the proxy object comprises a current state of the target application, and the updating the proxy object of the target application comprises controlling the first application manager to set the current state of the target application to a foreground running state.

11. The electronic device of claim 10, wherein if the startup operation is a startup operation of the target application triggered by the user on a desktop of the first operating system, the controlling the first application manager to send a startup operation request to the target application through the second application manager comprises:

controlling the desktop of the first operating system to send the startup operation request to the target application through the first application manager and the second application manager; and if the startup operation is a startup operation of the target application triggered by the user on a current application of the first operating system, the controlling the first application manager to send a startup operation request to the target application through the second application manager comprising:

controlling the current application to send the startup operation request to the target application through the first application manager and the second application manager.

12. The electronic device of claim 10, wherein the first operating system further comprises a window manager;

if a target operation comprises a background switching operation, the controlling the first operating system to send a target operation request to the second operating system comprising:

controlling a desktop of the first operating system to send a background switching request to the target application through the first application manager and the second application manager;

the controlling the second operating system to send a target operation success message to the first operating system comprising:

controlling the target application to send a background switching success message to the first application manager through the second application manager;

the updating a proxy object of the target application in the first operating system based on the target operation success message comprising:

controlling the first application manager to set the current state of the target application to a background freeze state; and before controlling a desktop of the first operating system to send a background switching request to the target application through the first application manager and the second application manager:

controlling the desktop of the first operating system to send the background switching request to the window manager; and controlling the window manager to switch a window of the target application to a background.

13. The electronic device of claim 12, wherein the first operating system further comprises a task manager;

if the target operation comprises a foreground switching operation, the controlling the first operating system to send a target operation request to the second operating system comprising:

controlling the task manager to send a foreground switching request to the target application through the first application manager and the second application manager;

the controlling the second operating system to send a target operation success message to the first operating system comprising:

controlling the target application to send a foreground switching success message to the first application manager through the second application manager;

the updating a proxy object of the target application in the first operating system based on the target operation success message comprising:

controlling the first application manager to set the current state of the target application to the foreground running state; and before controlling the task manager to send a foreground switching request to the target application through the first application manager and the second application manager:

controlling the task manager to send the foreground switching request to the window manager; and controlling the window manager to switch the window of the target application to a foreground.

14. The electronic device of claim 13, wherein if the target operation comprises a closing operation, the controlling the first operating system to send a target operation request to the second operating system comprises:

controlling the task manager to send a closing operation request to the target application through the first application manager and the second application manager;

the controlling the second operating system to send a target operation success message to the first operating system comprising:

controlling the target application to send a closing success message to the first application manager through the second application manager; and the updating a proxy object of the target application in the first operating system based on the target operation success message comprising:

controlling the first application manager to delete the proxy object of the target application.

15. The electronic device of claim 10, wherein after performing the startup operation in the second operating system:

controlling the second application manager to update the current state of the target application based on the target operation.

16. The electronic device of claim 10, wherein the proxy object further comprises name information of the target application, and the name information of the target application corresponds to the current state one by one.

17. The electronic device of claim 10, wherein the connection between the first operating system and the second operating system is a socket connection.

18. A non-transitory computer-readable storage medium having a computer program stored thereon which, when executed by a processor, performs operations comprising:

establishing a connection between a first operating system and a second operating system, wherein the first operating system comprises a first application manager, and the second operating system comprises a second application manager, and the establishing the connection between the first operating system and the second operating system comprises establishing a connection between the first application manager and the second application manager;

in response to a startup operation on a target application by a user, controlling the first application manager to send a startup operation request to the target application through the second application manager, wherein the target application is an application program of the second operating system included in the first operating system;

performing the startup operation in the second operating system and controlling the target application to send a startup success message to the first application manager through the second application manager; and updating, in the first operating system, a proxy object of the target application, based on the startup success message, wherein the proxy object comprises a current state of the target application, and the updating the proxy object of the target application comprises controlling the first application manager to set the current state of the target application to a foreground running state.

* * * * *